US008979496B2

(12) United States Patent
Eyraud

(10) Patent No.: US 8,979,496 B2
(45) Date of Patent: Mar. 17, 2015

(54) SYSTEM FOR VARYING THE ANGLE OF ATTACK OF THE BLADES OF AN AIRCRAFT TURBINE ENGINE PROPELLER, USING A BRUSHLESS ELECTRIC MOTOR

(75) Inventor: Jean-Louis Eyraud, Maincy (FR)

(73) Assignee: SNECMA, Paris (FR)

( * ) Notice: Subject to any disclaimer, the term of this patent is extended or adjusted under 35 U.S.C. 154(b) by 520 days.

(21) Appl. No.: 13/502,385

(22) PCT Filed: Oct. 19, 2010

(86) PCT No.: PCT/EP2010/065698

§ 371 (c)(1), (2), (4) Date: Apr. 17, 2012

(87) PCT Pub. No.: WO2011/048081

PCT Pub. Date: Apr. 28, 2011

(65) Prior Publication Data

US 2012/0207598 A1 Aug. 16, 2012

(30) Foreign Application Priority Data

Oct. 22, 2009 (FR) ..................................... 09 57437

(51) Int. Cl.
*B64C 11/44* (2006.01)

(52) U.S. Cl.
CPC . *B64C 11/44* (2013.01); *Y02T 50/66* (2013.01)
USPC ................................ 416/155; 416/167; 416/1

(58) Field of Classification Search
CPC ..... F04D 29/232; F04D 29/362; B64C 11/30; B64C 11/44
USPC ............................................. 416/1, 155, 167
See application file for complete search history.

(56) References Cited

U.S. PATENT DOCUMENTS 4,591,313 A 5/1986 Miyatake et al.
5,281,094 A * 1/1994 McCarty et al. .............. 416/147
5,451,141 A * 9/1995 Carvalho et al. .............. 416/152
5,595,474 A * 1/1997 Girard .............................. 416/1
5,967,749 A * 10/1999 Eaves et al. ....................... 416/3

FOREIGN PATENT DOCUMENTS

EP 2 028 099 2/2009

OTHER PUBLICATIONS

International Search Report issued on Jan. 28, 2011 in PCT/EP10/65698 filed on Oct. 19, 2010.

* cited by examiner

*Primary Examiner* — Ninh H Nguyen
(74) *Attorney, Agent, or Firm* — Oblon, McClelland, Maier & Neustadt, L.L.P.

(57) ABSTRACT

A system for varying an angle of attack of blades of an aircraft turbine engine propeller, including an axial flow brushless motor including a stator including coils, and a rotor including permanent magnets. The rotor is mounted axially movable between a locked position in which it is secured in rotation with a rotary hub of the propeller, and an unlocked position in which its rotation relative to the hub along the axis of rotation of the propeller causes a variation of the angle of attack of the blades via a mechanical connecting mechanism.

12 Claims, 9 Drawing Sheets

2
13
22
24
10b
10a
10
20
9
18
4
6
12
14
26
26a
26b 2
4
6
9
9
10
10a
10b
12
13
13
14
18
18
20
20
22
22
24
24
26
26a
26b

SYSTEM FOR VARYING THE ANGLE OF ATTACK OF THE BLADES OF AN AIRCRAFT TURBINE ENGINE PROPELLER, USING A BRUSHLESS ELECTRIC MOTOR

TECHNICAL FIELD

The present invention generally relates to the field of systems for varying the angle of attack of the blades of an aircraft turbine engine propeller, this type of system also being referred to as a device for setting the angle of attack or a pitch variation device.

Here, the invention applies to any aircraft turbine engine, such as a single-propeller turboprop, or a turboprop with two contra-rotating propellers, i.e. a double row of contra-rotating propellers, for example of the "Open Rotor" type.

BACKGROUND OF THE INVENTION

Known from the prior art is a system for varying the angle of attack of the blades of a propeller, based on the use of the hydraulic cylinder whereof the piston is mechanically connected to a drive wheel of the blade roots. The variation of the angle of attack of the blades is done by modifying the exit reach of the piston.

This widespread principle nevertheless has the drawback of requiring a significant hydraulic circuit, integrating, in addition to the cylinder, a pump, an oil reservoir, and significant tubing. This is costly in terms of mass and bulk, whereas the propeller integrating that system is already very bulky due to the presence of other equipment.

Furthermore, the presence of a hydraulic circuit creates a risk of oil leak capable of causing a fire within the turbine engine.

BRIEF DESCRIPTION OF THE INVENTION

The invention therefore aims to at least partially resolve the aforementioned drawbacks, relative to the embodiments of the prior art.

To that end, the invention first relates to a system for varying the angle of attack of the blades of an aircraft turbine engine propeller, each blade being pivotably mounted on a hub rotating along an axis of rotation of said propeller, said system comprising an axial flow brushless electric motor comprising a stator equipped with coils, intended to be securely mounted on a stationary part of the turbine engine, as well as a rotor equipped with permanent magnets, the rotor and the stator being centered on the axis of rotation of said propeller and arranged so that the coils are located opposite said permanent magnets in the direction of said axis of rotation. Furthermore, it comprises mechanical connecting means between said rotor and said blades, and, furthermore, said rotor is axially movably mounted between a locked position in which it is rotationally secured to the rotating hub, and an unlocked position in which its rotation relative to said hub along the axis of rotation of the propeller causes, via said mechanical connecting means, a variation in the angle of attack of the blades.

Using the axial flow brushless electric motor makes it possible to eliminate the bulky hydraulic circuit encountered in the prior art, thereby eliminating the leak risk associated with the presence of that circuit. In general, the design of the system is simplified, and its bulk reduced, especially close to the driveshaft of the propeller.

By having an axial flow, this electric motor can in fact have a significant diameter moving it considerably away from the driveshaft of the propeller, where the temperature conditions are considerably less severe.

This architecture provides significant flexibility to completely free the space at the center of the hub from supporting the pitch control, this freed space then being able to house a reduction gear and/or a contra-rotating drive device of the propeller. It therefore considerably simplifies the design of the latter elements, and thereby guarantees them greater reliability.

Furthermore, unlike other possible designs, it does not require the transfer of electric energy by sliding contact between the stationary part and the rotary part of the electric generator, which is a known source of malfunction in this type of environment.

Furthermore, the large diameters possible with this type of motor are favorable to low ratings and high torques.

The invention generally allows simple, non-bulky, and reliable control of the angle of attack of the blades of the turbine engine propeller.

Preferably, the system is designed so that the axial movement of said rotor between its locked position and its unlocked position, and/or its reverse movement, is done by generating an axial repulsion/attraction force between the coils and the magnets. Here, it is therefore the coils and the magnets that are used to ensure at least one of the axial movements of the rotor, by controlling the coils in a suitable manner to obtain the desired repulsion/attraction force. Preferably, the two movements are each done by axial repulsion, attraction force, respectively, between the coils and the magnets. In the event only one of the two movements is done by axial repulsion/attraction force, the other axial movement can be done using elastic return means.

Other principles known by those skilled in the art can nevertheless be considered to obtain axial movements of the rotor of the brushless motor, without going beyond the scope of the invention.

Preferably, the system comprises a mechanical device for locking the rotation of the rotor with the rotary hub, the device being triggered when the rotor is its locked position. For example, this may be a mechanical device for locking rotation comprising toothed wheels.

Preferably, said mechanical connecting means between said rotor and said blades comprise, associated with each blade, a finger secured with said rotor sliding in a lumen of an arm fixed in rotation relative to the concerned blade, along its pivot axis. Other designs can nevertheless be considered without going beyond the scope of the invention.

Preferably, the system also comprises at least one energy storing device intended to be inserted between the rotor and the rotary hub, said storage device being designed to store energy during the rotation of the rotor aiming to increase the angle of attack of the blades. Thus, in the event of an incident occurring on the turbine engine, this energy can be released to return the blades to their minimum angle of attack, so as to feather the propeller.

The invention also relates to an aircraft turbine engine propeller comprising a system as described above, used to steer the angle of attack of its blades.

This propeller also integrates a hub centered on a longitudinal axis, a shaft for driving the rotation of said hub also centered on the longitudinal axis, and a plurality of blades each pivotably mounted on said hub, along a pivot axis.

Preferably, said rotor of the brushless electric motor is arranged around said rotary hub, which advantageously gives it a very large diameter.

Furthermore, the invention also relates to an aircraft turbine engine comprising at least one propeller as described above. As previously mentioned, this may be a single-propeller turboprop, or a turboprop with two contra-rotating propellers, for example of the "Open Rotor" type. In this last case, each of the two propellers therefore has its own system for varying the angle of attack of its blades.

Lastly, the invention relates to a method for controlling the angle of attack of the blades of an aircraft turbine engine propeller, using the system as described above. To modify the angle of attack of the blades, it comprises the following steps:

unlocking the rotor of the brushless electric motor, by moving it axially from its locked position to its unlocked position;

rotating the rotor to bring the blades to a desired angle of attack; and locking the rotor of the brushless electric motor, by axially moving it from its unlocked position to its locked position.

Preferably, as mentioned above, at least one of the unlocking steps is done by generating an axial repulsion/attraction force between the coils and the magnets.

Other advantages and features of the invention will appear in the non-limiting detailed description below.

BRIEF DESCRIPTION OF THE DRAWINGS

This description will be done in light of the appended drawings, in which.

DETAILED DESCRIPTION OF PREFERRED EMBODIMENTS

Figure 1:
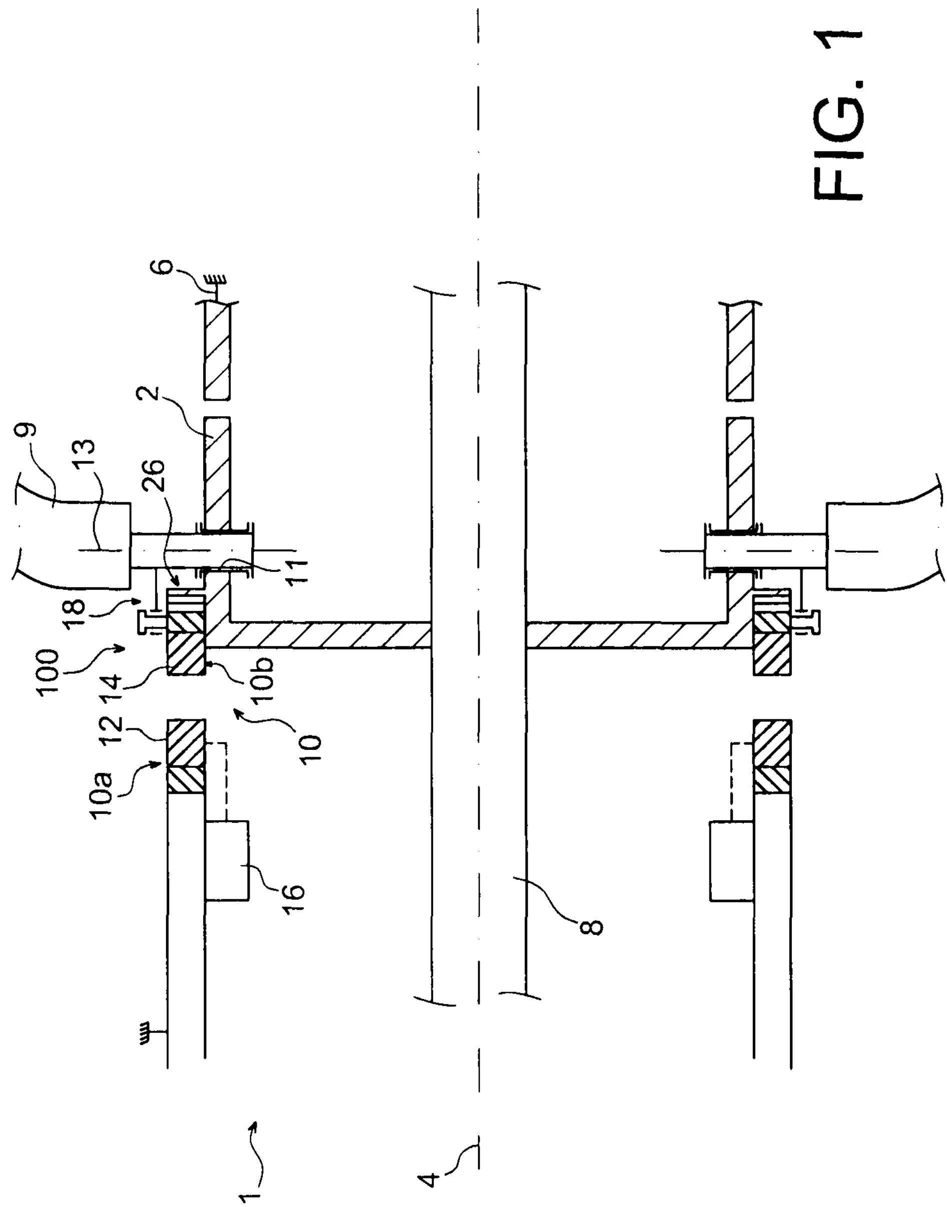
FIG. 1 shows a longitudinal cross-sectional view of part of an aircraft turbine engine propeller, according to one preferred embodiment of the present invention.

FIG. 1 shows an aircraft turbine engine propeller 1, preferably of the single-propeller turboprop type.

The propeller 1 comprises a hub or disc 2 centered on a longitudinal axis 4 of the propeller, said disc being rotatably mounted relative to a stator 6 of the propeller, along the axis 4. It is rotated by a driveshaft 8 also centered on the longitudinal axis 4, said shaft being able to be an output shaft of the gearbox powered by a gas generator of the turbine engine, or an output shaft of said gas generator. The permanent rotational torque of the shaft 8 with the hub 2 was done traditionally, as known by those skilled in the art.

At its periphery, the hub 2 supports a plurality of propeller blades 9, for example ten or more, each pivotably mounted in a corresponding opening 11 of the hub 2, along a pivot axis 13. The pivot axes 13 are all situated in the same plane orthogonal to the axis of the propeller 4, and preferably radially oriented.

The propeller 1 also comprises a system 100 for varying the angle of attack of the blades, allowing their angles of attack to be controlled simultaneously.

This system 100 comprises an axial flow brushless electric motor 10, comprising a stator 10*a* securely mounted on the stator 6 of the propeller and equipped with coils 12, as well as a rotor 10*b* equipped with permanent magnets 14, and mounted around the rotary hub 2. Furthermore, the motor comprises control means 16 making it possible to control the electric power of the coils, this type of control means being known by those skilled in the art.

The rotor 10*b* and the stator 10*a* are centered on the axis of rotation of the propeller, corresponding to the axis 4. In order to allow the axial flow between them, they are arranged so that the coils 12 are opposite the permanent magnets 14 in the direction of said axis of rotation 4. The rotor 10*b* and the stator 10*a* therefore have a significant diameter, and are arranged so that the coils 12 and permanent magnets 14 are situated radially toward the outside relative to the portion of the blade roots housed in the openings 11 of the hub 2.

The stator 10*a* assumes the form of a crown fixedly supporting, for example in the appropriate housings of that crown, the coils 12 spaced circumferentially apart from one another, and for example of which there are nine. The rotor 10*b* also assumes the form of a crown fixedly supporting, for example in the appropriate housings of said crown, the permanent magnets 14 spaced circumferentially apart from one another, and for example of which there are fourteen, the number thereof being smaller than the number of coils.

This type of brushless motor works by creating, using the control means 16, a rotary field in the coils 12. To make the rotor rotate in a first direction of rotation, the field must rotate in advanced phase on the rotation, and vice versa to rotate the rotor in the opposite direction of rotation.

The system 100 also comprises connecting means between the rotor 10*b* and the blades 9. These means, generally referenced by reference 18 in FIG. 1, will be outlined in reference to FIG. 2. In that figure, one can see that each blade 9 is associated with its own connecting means 18 with the rotor 10*b*, said means here consisting of a finger 20 secured to the rotor 10*b* and protruding radially outwardly, as well as an arm 22 secured in rotation relative to its associated blade 9, on the pivot axis 13. Furthermore, the arm 22 has a lumen 24 in which the finger 20 slides.

Figure 2:
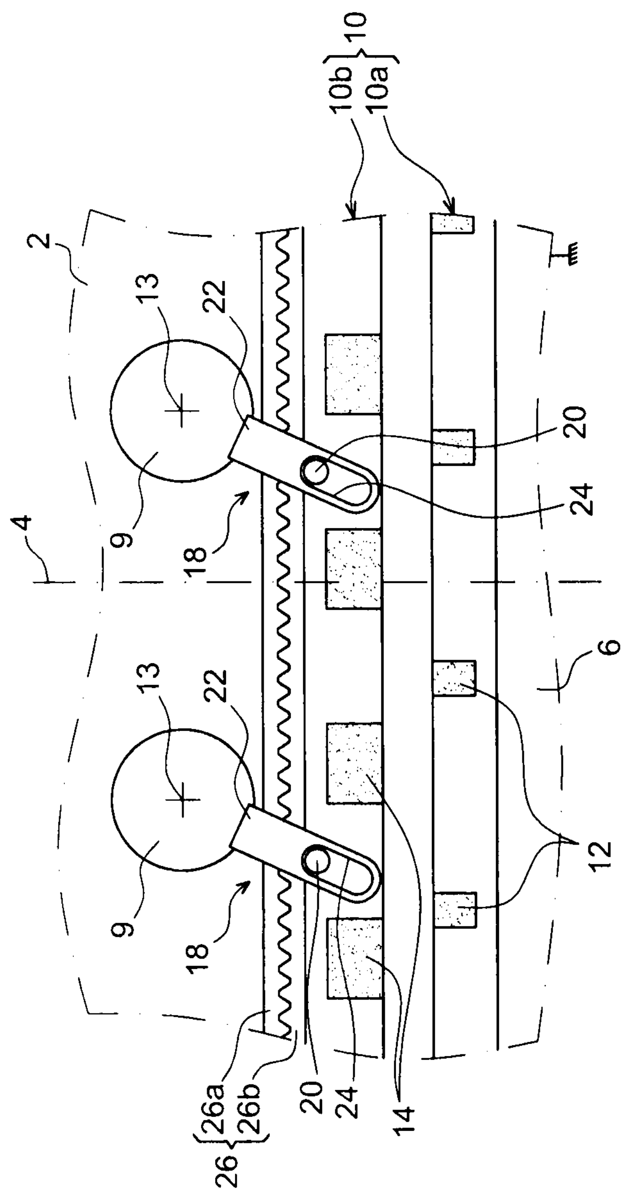
FIG. 2 shows a partial view, deployed in a plane, of part of the propeller of FIG. 1, seen radially from the outside.

The system 100 also comprises a mechanical device 26 for locking the rotation of the rotor 10*b* with the rotary hub 2, said device here comprising a first toothed wheel 26*a* centered on axis 4 and secured with the crown of the rotor 10*b*, as well as a second toothed wheel 26*b* with the same diameter, centered on the axis 4 and secured to the hub 2. In FIG. 2, one can see the mechanical device 26 in its engaged configuration, obtained owing to the engagement of the teeth of the two wheels 26*a*, 26*b* preventing the relative rotation of the rotor 10*b* in relation to the hub 2. As will now be outlined, the rotor 10*b* thus positioned occupies a so-called locked position, as opposed to a so-called unlocked position that it can also occupy.

In fact, one of the particularities of the present invention lies in the fact that the rotor 10*b* is mounted axially movably between the locked position of FIG. 2, in which is secured in rotation with the rotary hub 2, and the unlocked position in which its rotation relative to the hub causes, via the mechanical connecting means 18, a variation in the angle of attack of the blades 9.

Figure 3:
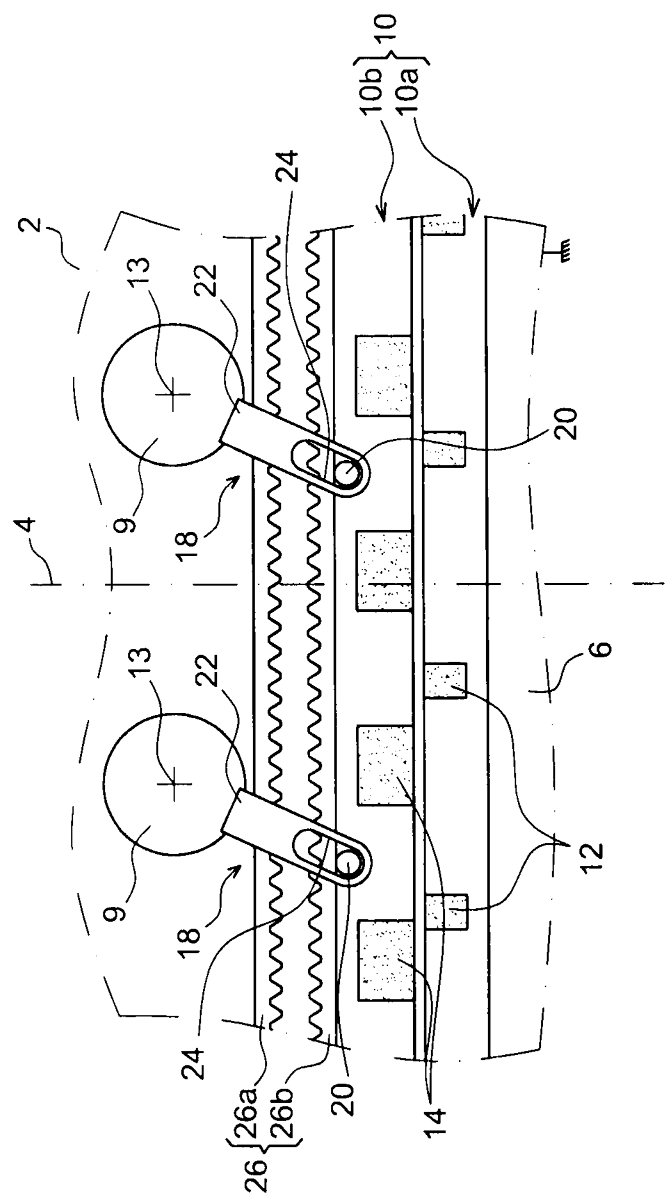
FIGS. 3 to 5 diagram an operation for changing the angle of attack the blades, using the dedicated system equipping the propeller, the system for varying the angle of attack of the blades also being an object of the present invention.
Figure 4:
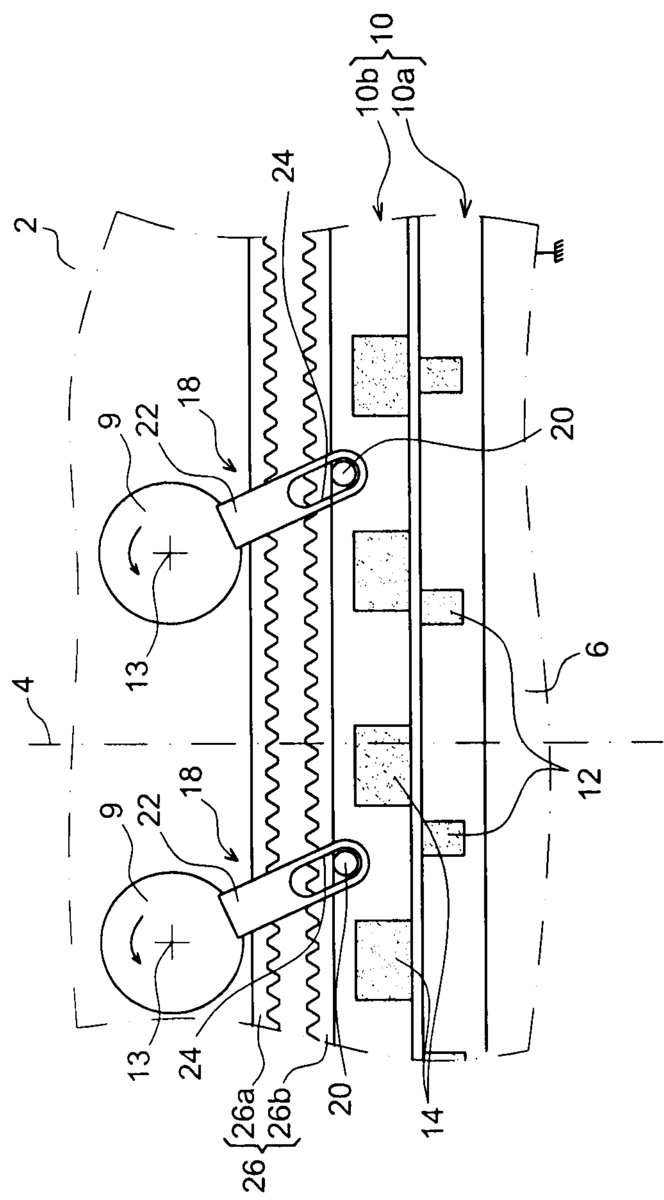

In this respect, an operation to change the angle of attack of the blades will now be outlined in reference to FIGS. 2 to 5. In FIG. 2, the engagement of the mechanical device 26 therefore prevents the relative rotation of the rotor 10*b* and the hub 2, which are driven jointly by the driveshaft, with the blades 9 occupying a given angle of attack, maintained as long as the mechanical device 26 remains engaged. When it is necessary to change the angle of attack of the blades, the rotor 10*b* is first unlocked, by moving axially toward its unlocked position, in which is spaced away from the toothed wheel 26*b* as shown in FIG. 3, and brought closer to the stator 10*a*. Due to the sliding of the rotor 10*b* on the hub 2 in the axial direction, the engagement of the teeth of the wheels 26*a*, 26*b* is broken. Furthermore, during this movement of the rotor 10*b*, each finger 20 also slides in its associated lumen 24, substantially over the entire length thereof.

Then, the control means 16 of the motor power the coils in order to rotate the rotor 10*b* by a predetermined angular amplitude, causing the blades 9 to be brought to a desired angle of attack via the mechanical connection means 18. As diagrammed in FIG. 4, the rotation of the fingers 20 by the rotor 10*b* causes their associated arm 22 to pivot along the axis 13, which then rotates the entire blade 9 in rotation along that same axis.

Figure 5:
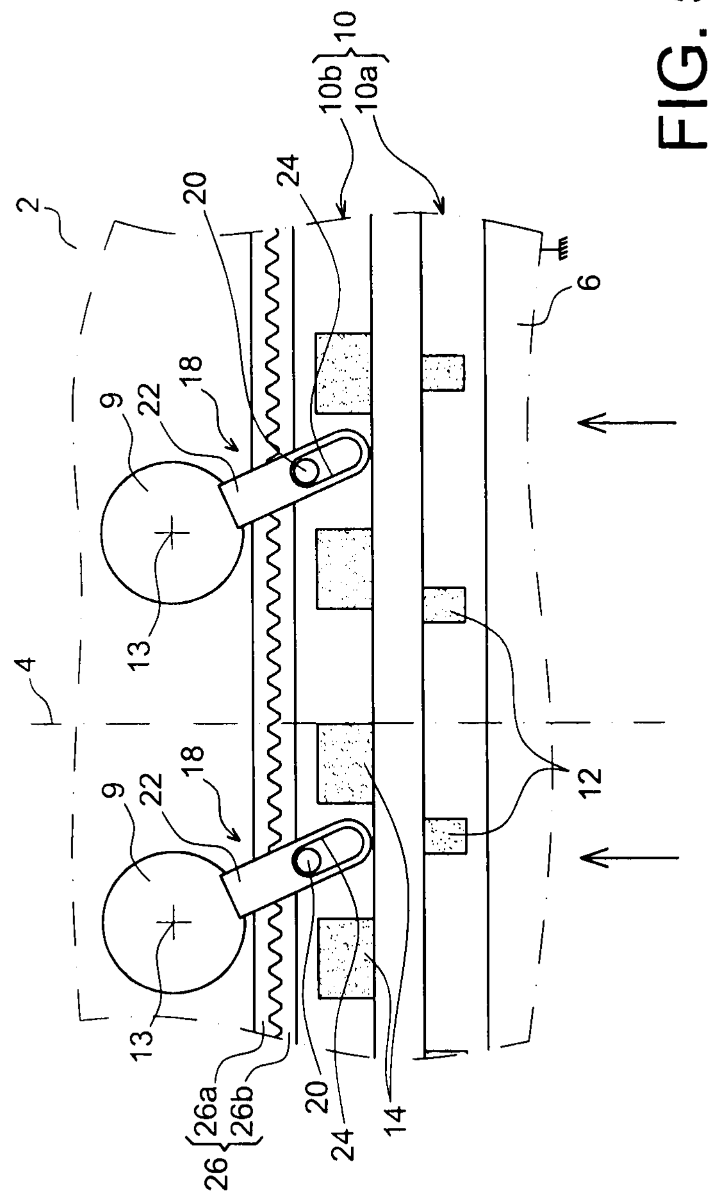

Once the desired angle of attack is achieved, the rotor 10*b* is locked, by moving axially toward its locked position, in which it is again brought closer to the toothed wheel 26*b* as shown in FIG. 5, and moved away from the stator 10*a*. As a result of the sliding of the rotor 10*b* on the hub 2 in the axial direction, the engagement of the teeth of the wheels 26*a*, 26*b* is again activated, such that the angle of attack of the blades can no longer be modified before carrying out a new operation to change the angle of attack similar to that just described.

For information, it should be noted that for the engagement of the teeth to modify the angle of attack of the blades only slightly or not at all, the pitch of the teeth of the wheels 26*a*, 26*b* is close or identical to the pitch for adjusting the angle of attack of the blades.

This preferred embodiment is done so that the relative angular position of the rotor 10*b* and the hub 2 is not modified during the axial movements of the rotor 10*b*, so as not to involuntarily modify the angle of attack of the blades. The electromagnetic solution for setting the rotor in motion, which will be outlined below, is one possibility considered to obtain such functionality.

It should also be noted that the configuration of the mechanical connecting means 18 is such that it may potentially create a change in the angle of attack of the blades during the axial movement of the rotor 10*b* intended to unlock it, even when the latter is not moved angularly relative to the hub 2 during such an axial movement. In such a scenario, this parasitic movement is taken into account in the extent of the rotation of the rotor, so that the obtained angle of attack of the blades at the end of the modification operation is the desired change. In other words, if such a parasitic movement is thought to occur, then the rotation of the rotor 10*b* is stopped in a position in which it places the blades 9 in a different angle of attack than that which will ultimately be obtained, after locking said rotor 10*b*.

As mentioned above, the locking and unlocking of the rotor 10*b* may wisely be done using the electric motor 10 controlled in a particular way, and not using the additional driving device, although that option does remain possible.

For the unlocking, the coils and permanent magnets are used so as to generate an attraction force causing the rotor 10*b* to move axially toward the stator 10*a*. More specifically, the coils 12 are controlled so as to obtain a fixed axial field in the rotary reference. To create this field from the stator 10*a*, the coils 12 are switched at the same speed as the speed of rotation of the hub 2, so as to have, at all times, a majority of coils and magnets in opposite directions facing each other, to generate the aforementioned attraction force. This field, seen from the rotor 10*b*, has a constant axial orientation, while seen from the stator, it also has a constant axial orientation, but rotates at the speed of the rotor 10*b* and the hub 2.

Figure 6A:
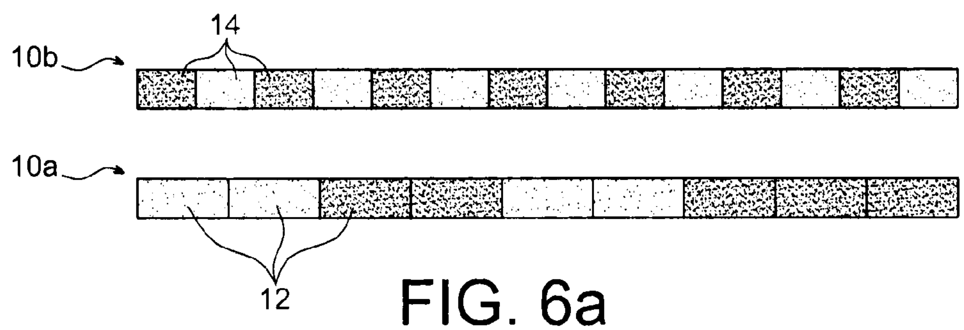
FIGS. 6*a* and 6*b* show a first possible configuration of magnets and coils equipping the axial flow brushless motor of the system to vary the angle of attack.
Figure 6B:
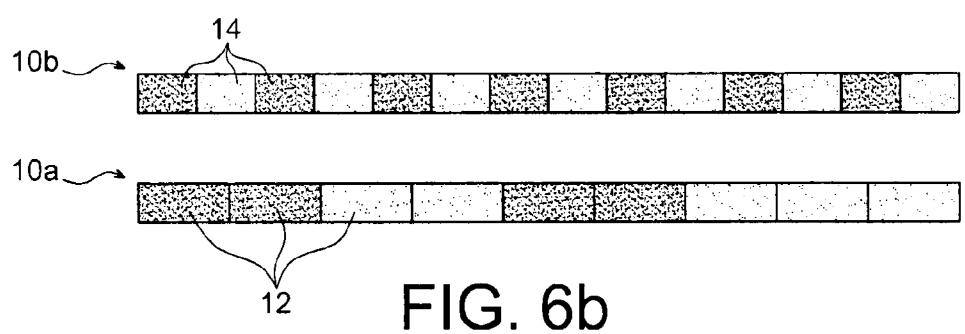

FIG. 6*a* shows a diagrammatic view deployed in a plane of the coils 12 and the magnets 14 equal to the brushless motor 10. In the adopted configuration with nine coils and fourteen magnets, it is in fact possible to control the polarities of the coils 12 so that at each moment, each of them has as large a surface as possible across from a magnet with an opposite polarity. Here, in the most favorable case, 60% of the total surface of the coils is across from a magnet of opposite polarity, which is sufficient to obtain the required attraction force, even if the rotor may vibrate due to the opposing force applied thereon, generated by the remaining 40% of the surface area. The same is true when a repulsion force is required, sought for the locking step, in which case the polarities of the coils 12 are controlled so that each moment, each of them has as large surface as possible across from a magnet of the same polarity, as shown in FIG. 6*b*. In that respect, in these figures, the dark gray corresponds to a positive polarity, while the light gray corresponds to a negative polarity.

Figure 6C:
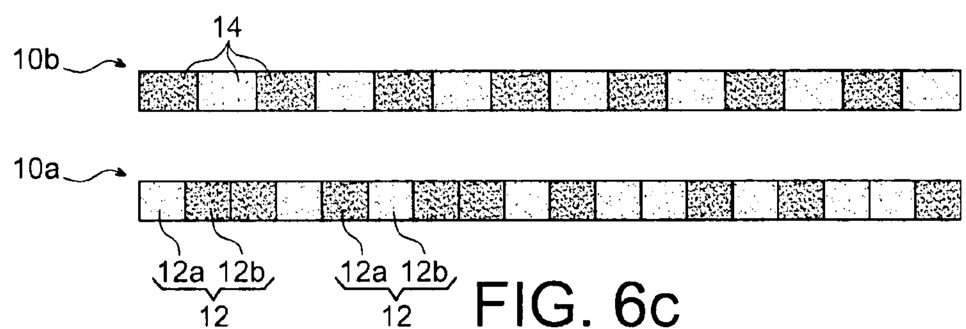
FIGS. 6*c* and 6*d* show a second possible configuration of magnets and coils for said brushless motor.
Figure 6D:
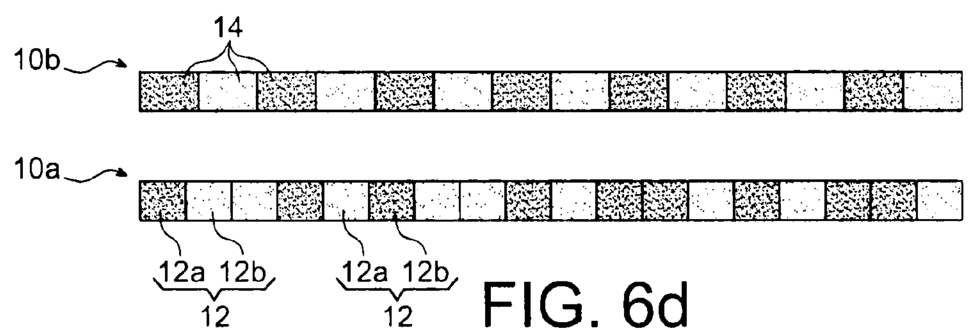

FIGS. 6*c* and 6*d* show another preferred embodiment in which each coil 12 is divided into two distinct parts 12*a*, 12*b*, which can adopt identical or opposite polarities. The maximum overlap surface can then be increased from 60% to 75%, which favors the obtainment of a more intense repulsion/attraction force, and decreases the vibration effects of the rotor.

It should be noted that in the preferred embodiment described above, the repulsion force is produced by the motor 10 not only during the locking step of the rotor 10*b*, but also when the latter is in the locked position, so as to maintain the engagement of the teeth of the two wheels 26*a*, 26*b* of the device 26 for blocking the rotation of the rotor 10*b*.

Figure 7:
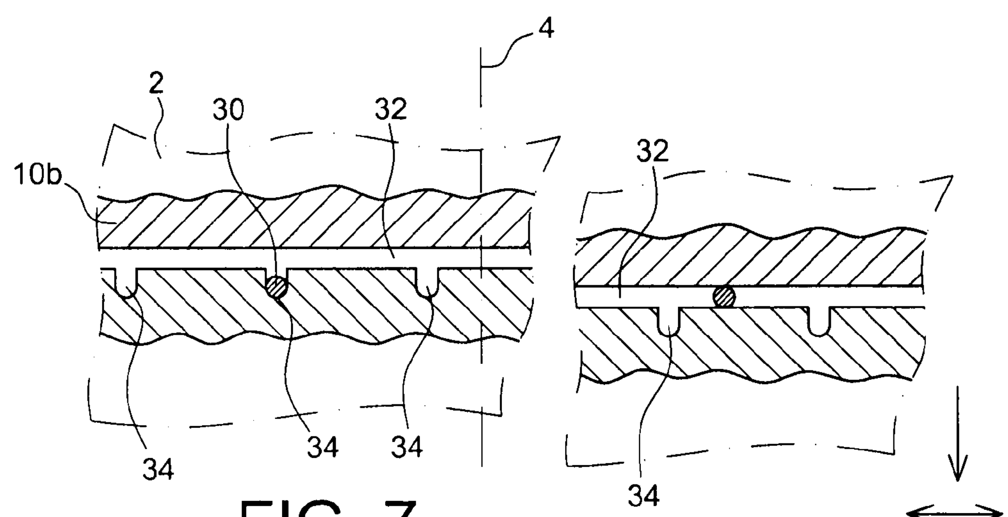
FIG. 7 shows a partial view, deployed in a plane, of part of the propeller of FIG. 1, showing a possible cooperation between the rotor of the brushless motor and the rotary hub of the propeller.

FIG. 7 shows a way to ensure that during the phase for setting the rotor 10*b* in rotation on the hub 2, done to change the angle of attack of the blades, said rotor does not move axially relative to said hub. To that end, the latter is equipped with one or more pins 30 protruding outwardly, while the rotor 10*b* has, on the inner surface thereof, a groove 32 whereof one side wall has housings 34 regularly spaced apart, at a distance corresponding to the pitch for adjusting the angle of attack of the blades. When the rotor is in the locked position as shown in the left part of FIG. 7, each pin 30 is inserted into one of the housings 34. As a result, this leads to rotational locking of the rotor relative to the hub, said system being able to complete the locking device 26, or replace it. On the other hand, after the rotor 10*b* is unlocked, each pin 30 is situated in a groove 32, so that when it is located between two housings 34 as shown in the right part of FIG. 7, no relative axial movement is possible between the rotating rotor and the hub 2.

Figure 8A:
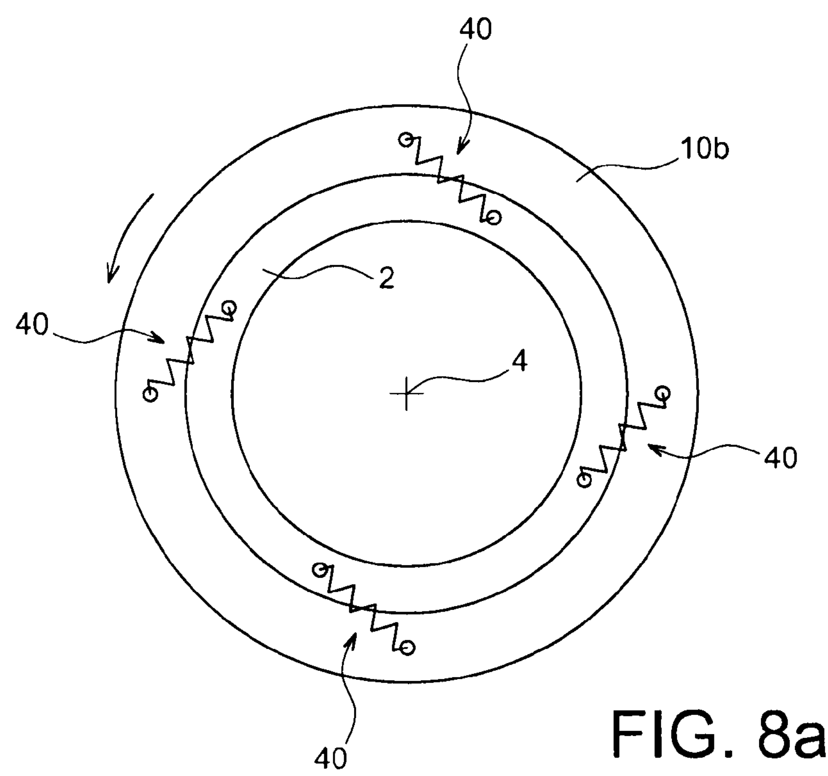
FIGS. 8*a* and 8*b* diagrammatically show an energy storing device inserted between the rotor of the brushless motor and the hub supporting the blades.
Figure 8B:
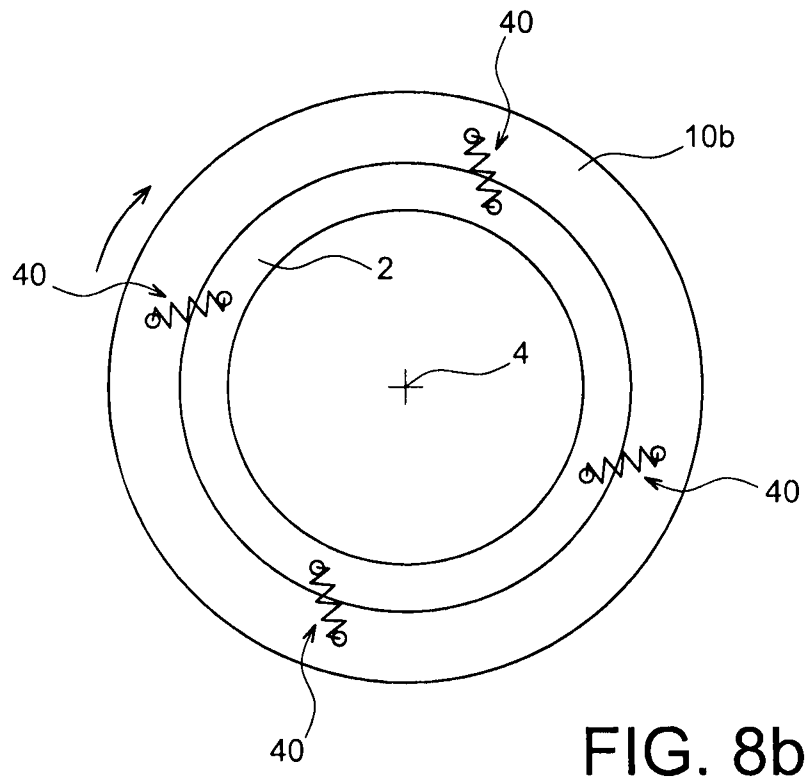

In order to impart a security function, also called "failsafe," the system 100 can be equipped with several energy storing devices 40 inserted between the rotor 10*b* and the rotary hub 2. Here, each device 40 assumes the form of a spring or equivalent means whereof both ends are respectively mounted on the elements 10*b*, two, these springs being designed to store energy during the rotation of the rotor intended to increase the angle of attack of the blades. With this configuration, in the event of an incident occurring on the turbine engine, the energy previously stored in the devices 40 is automatically released once the rotation of the rotor relative to the hub 2 is unlocked. The release of this energy produces relative rotation of the rotor in relation to the hub, in a direction that brings blades into their minimum angle of attack, thereby making it possible to feather the propeller. In this respect, FIG. 8*a* shows an arrangement with the devices 40 during the rotation of the rotor 10*b* aiming to increase the angle of attack of the blades, while FIG. 8*b* shows the same arrangement during the release of energy previously stored by the springs.

A hydraulic energy storage solution can also be considered, without going beyond the scope of the invention.

Figure 9A:
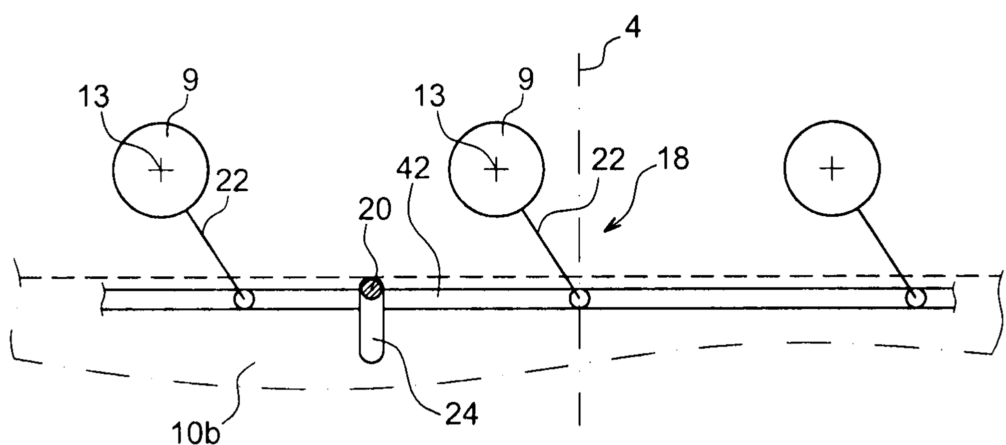
FIGS. 9*a* and 9*b* show views similar to those of FIGS. 3 and 4, with mechanical connecting means between the rotor and blades assuming the form of an alternative embodiment.
Figure 9B:
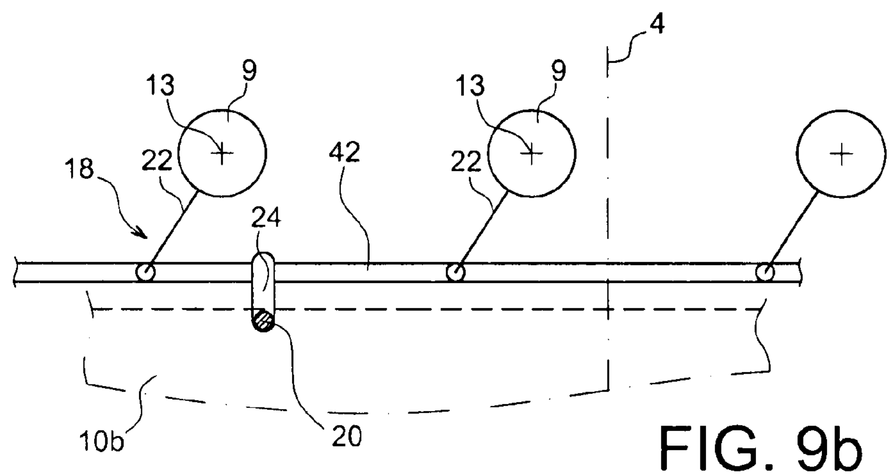

FIGS. 9*a* and 9*b* show mechanical connecting means between the rotor and the blades assuming the form of an alternative embodiment. Here, these means 18 still comprise, associated with each blade 9, an arm 22 secured in rotation therewith, along the pivot axis 13. Nevertheless, the distal end of each arm 22 is hinged on a shared ring 42 centered on the axis 4 and preferably arranged around the rotor 10*b*. The means 18 also comprise one or more driving fingers 20 secured with the rotor 10*b*, protruding radially outwardly and each sliding in an axial lumen 24 provided on the ring 42. Nevertheless, here, the number of pins and lumens can be significantly smaller than the number of blades of the propeller, unlike the embodiment shown in the preceding figures. Thus, in the locking position of the rotor as shown in FIG. 9*a*, each finger 20 is located at one end of its associated lumen, then slides to the opposite end during unlocking the rotor 10*b*, moving axially. In this position, the relative rotation of the rotor in relation to the hub, diagrammed in FIG. 9*b*, leads to the rotation of the ring 42 around the axis 4 owing to the fingers 20, as well as the pivoting of each arm 22 around its axis 13, leading to the variation of the angle of attack of the associated blade 9.

Figure 10:
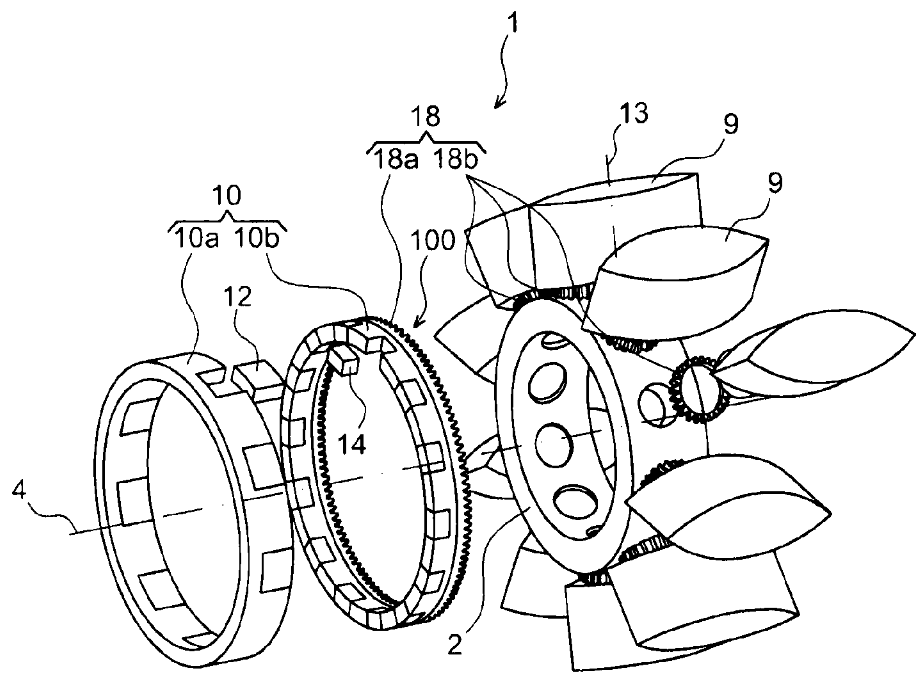
FIG. 10 shows a partially exploded perspective view of part of an aircraft turbine engine propeller, according to another preferred embodiment of the present invention.

Lastly, FIG. 10 shows another preferred embodiment of the present invention, which differs from the preceding embodiment essentially in the design of the mechanical connecting means 18 between the rotor and the blades. These means here comprise the toothed wheel 18*a* centered on the axis 4, which is an integral part of the rotor 10*b* of the brushless electric motor 10. Furthermore, they integrate, associated with each blade 9, a toothed wheel 18*b* secured in rotation to the root of the concerned blade. Thus, in the locked position of the rotor 10*b*, in which it is brought closer to the stator 10*a* as opposed to the preceding embodiment, the absence of meshing between the wheels 18*a*, 18*b* prevents the angle of attack of the blades from being modified by the toothed wheel 18*a*. In this respect, in FIG. 10, the device for locking the rotation of the rotor 10*b* relative to the hub 2 has not been shown, nevertheless specifying that it can assume any form considered appropriate by one skilled in the art. Furthermore, in this position, the blades 9 can be kept in their angle of attack by additional systems, also known by those skilled in the art. The mechanical connecting means 18 therefore here adopt a disengageable nature.

Furthermore, after having been moved axially toward its unlocked position where it is moved away from the stator 10*a*, the rotor 10*b* meshes with the wheels 18*b* via the wheel 18*a* it supports, so that its rotation causes a modification in the angle of attack of the blades.

Of course, various changes can be made by one skilled in the art to the invention just described, solely as non-limiting examples.

The invention claimed is:

1. A system for varying an angle of attack of the blades of an aircraft turbine engine propeller, each blade being pivotably mounted on a hub rotating along an axis of rotation of the propeller, the system comprising:
- an axial flow brushless electric motor comprising a stator comprising coils, configured to be securely mounted on a stationary part of the turbine engine;
- a rotor comprising permanent magnets, the rotor and the stator being centered on the axis of rotation of the propeller and arranged so that the coils are located opposite the permanent magnets in the direction of the axis of rotation;
- mechanical connecting means between the rotor and the blades; and
- wherein rotor is axially movably mounted between a locked position in which it is rotationally secured to the rotating hub, and an unlocked position in which its rotation relative to the hub along the axis of rotation of the propeller causes, via the mechanical connecting means, a variation in the angle of attack of the blades.

2. The system according to claim 1, wherein the system is configured so that the axial movement of the rotor between its locked position and its unlocked position, and/or its reverse movement, is executed by generating an axial repulsion/attraction force between the coils and the magnets.

3. The system according to claim 1, further comprising a mechanical device for locking the rotation of the rotor with the rotary hub, the device being triggered when the rotor is in its locked position.

4. The system according to claim 3, wherein the mechanical rotational locking device comprises toothed wheels.

5. The system according to claim 1, wherein the mechanical connecting means between the rotor and the blades comprises, associated with each blade, a finger secured with the rotor sliding in a lumen of an arm fixed in rotation relative to the concerned blade, along its pivot axis.

6. The system according to claim 1, further comprising at least one energy storing device configured to be inserted between the rotor and the rotary hub, the storage device configured to store energy during the rotation of the rotor to increase the angle of attack of the blades.

7. An aircraft turbine engine propeller comprising a system according to claim 1.

8. The propeller according to claim 7, further integrating a hub centered on a longitudinal axis, a shaft for driving the rotation of the hub also centered on the longitudinal axis, and a plurality of blades each pivotably mounted on the hub, along a pivot axis.

9. The propeller according to claim 8, wherein the rotor of the brushless electric motor is arranged around the rotary hub.

10. An aircraft turbine engine comprising at least one propeller according to claim 7.

11. A method for controlling an angle of attack of the blades of an aircraft turbine engine propeller, using the system according to claim 1 to modify the angle of attack of the blades, comprising:
- unlocking the rotor of the brushless electric motor, by moving it axially from its locked position to its unlocked position;

rotating the rotor to bring the blades to a desired angle of attack; and locking the rotor of the brushless electric motor, by axially moving it from its unlocked position to its locked position.

12. The method according to claim 11, wherein at least one unlocking is executed by generating an axial repulsion/attraction force between the coils and the magnets.

* * * * *